United States Patent Office 2,835,424
Patented May 20, 1958

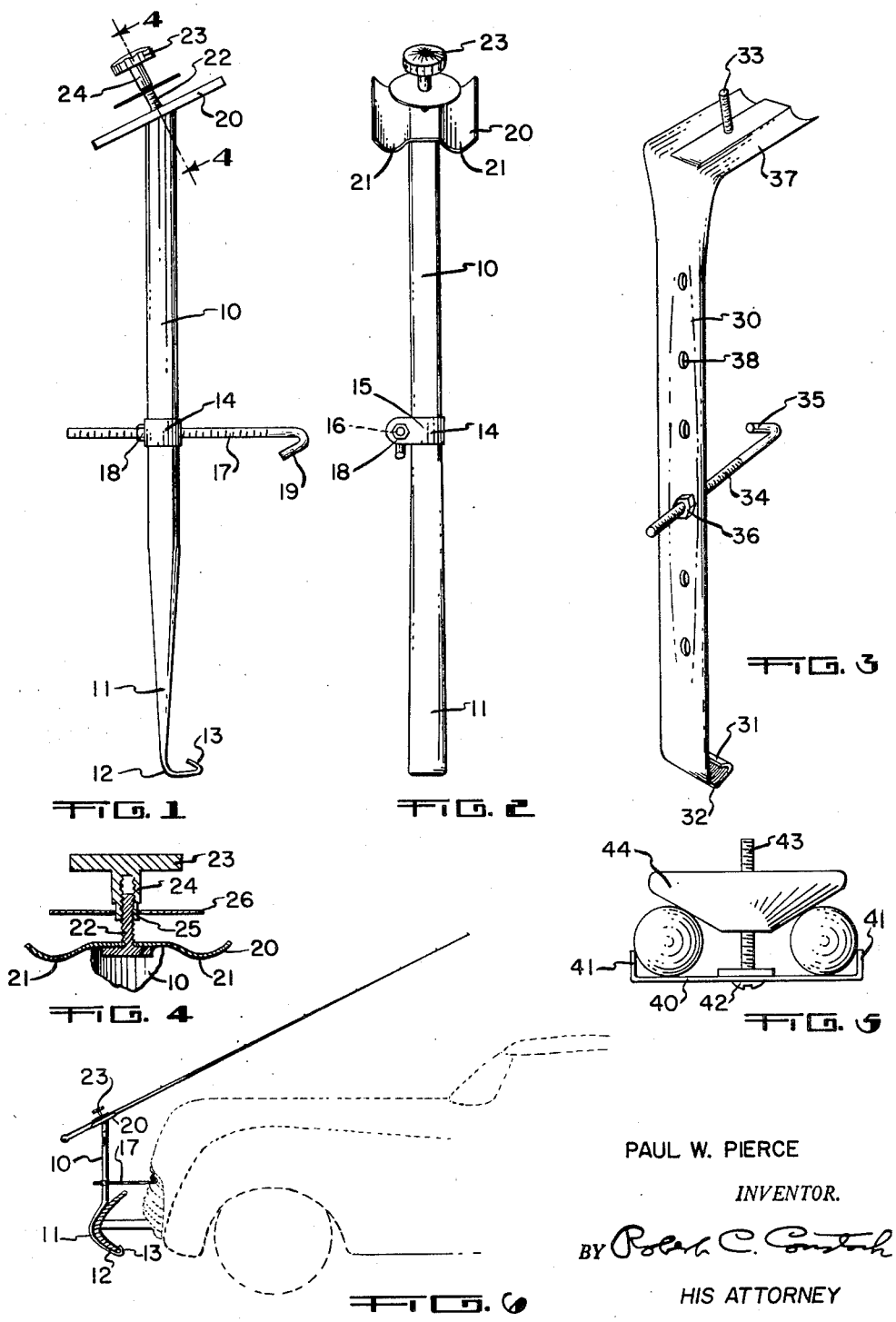

2,835,424

FISHING POLE CARRIER FOR AUTOMOBILES

Paul W. Pierce, Whittier, Calif.

Application November 15, 1954, Serial No. 468,711

6 Claims. (Cl. 224—42.03)

This invention relates to a fishing pole carrier for automobiles.

It is an object of my invention to provide a device which is adapted to be attached to a conventional automobile in order to hold and carry one or more fishing poles. The average amateur fishing enthusiast now has no satisfactory means for carrying fishing poles while traveling to and from fishing areas in his automobile. It is an object of my invention to provide a device which will serve this purpose and which will permit the poles to be carried in such a manner that they do not interfere with the normal use and operation of the automobile and do not present a hazard to the occupants of the automobile or to other vehicles on the road.

It is a further object of my invention to provide such a device which is adapted to be easily and quickly attached to any conventional passenger automobile and which is as easily and quickly removed when it is no longer needed or in use.

Another object of my invention is to provide such a device which is adapted to hold and carry the fishing poles securely without damaging them in any way and in which the poles can be quickly and easily installed and removed. My device is adapted to carry a single fishing pole or a plurality of fishing poles of the same or different sizes.

It is also among the objects of my invention to provide such a device which fits or can easily be adapted to fit substantially every make and model of passenger automobile which is in common use.

A further object of my invention is to provide a device of the type described which can be easily and economically manufactured of readily available materials so that it can be sold at a relatively low price for widespread sale and use by the purchasing public.

My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of my invention.

Referring to the drawings,

Fig. 1 is a side elevational view of a preferred embodiment of my fishing pole carrier;

Fig. 2 is a front elevational view of the same;

Fig. 3 is a front isometric view of another embodiment of my fishing pole carrier;

Fig. 4 is a sectional view of the pole holding portion of my carrier, taken on line 4—4 of Fig. 1;

Fig. 5 is an enlarged detailed end view of another embodiment of the pole holding portion of my carrier;

Fig. 6 is a side elevational view of my fishing pole carrier in use, with the bumper portion of the automobile exaggerated for purposes of illustration.

A preferred embodiment which has been selected to illustrate my invention comprises an elongated body member 10, which is preferably formed of tubular metal. Body member 10 is provided adjacent its lower end with a flattened portion 11, where the sides of the tube are brought together. The flattened portion 11 is provided with a curve 12 and is bent back at the end to form a hook 13.

Slidably mounted on body member 10 is a U-shaped member 14, the center of which is curved to fit around body member 10, while its ends 15 are straight and extend outwardly from the opposite side of body member 10. Each of the ends 15 is provided with a round opening 16, the openings being aligned with each other.

An elongated rod 17 extends through opening 16. Rod 17 is provided at the end adjacent to U-shaped member 14 with screw threading on which is mounted a threaded nut 18, which is disposed on the side of U-shaped member 14 adjacent to the end of rod 17. The opposite end of rod 17 is bent back upon itself to form a catch 19. Rod 17 thus extends through opening 16 transversely to body member 10 and the distance between catch 19 and body member 10 can be controlled by tightening or loosening the nut 18.

Mounted on the upper end body member 10 and extending at approximately a 45 degree angle with respect thereto is a carrier plate 20, which is preferably formed of metal. Carrier plate 20 is provided with a pair of elongated channels 21, which extend for its entire length, one being disposed on each side of body member 10.

Mounted at the end of body member 10 adjacent the center of carrier plate 20 is an upstanding bolt 22, the head of which is disposed within the end of body member 10 while its screw threaded shank extends outwardly and upwardly from carrier plate 20. The shank of bolt 22 extends at a right angle from the center of carrier plate 20 and at a 45 degree angle with respect to body member 10.

In the manufacture or assembly of my device, the carrier plate 20 and bolt 22 can both be attached to the upper end of body member 10 at the same time by the use of silver solder. Other suitable fastening means may also be used.

A manually operable knob 23 is screw threadably mounted on the end of bolt 22. Knob 23 is provided with an enlarged knurled head and an elongated shank 24 having screw threading which fits around and receives the screw threading of bolt 22. The shank 24 has at its lower end an end portion 25 of reduced outer diameter. A large flat circular washer 26 is provided with a central opening which fits around end portion 25 of shank 24. The washer 26 is somewhat loosely mounted so that it is free to rotate with respect to the shank 24 or to remain motionless while shank 24 rotates. The bottom of shank 24 is slightly flattened to prevent the washer 26 from coming off the shank 24. The diameter of the central opening of washer 26 is larger than the diameter of the end portion 25, but smaller than the diameter of the shank 24.

In use, my device is attached to an automobile by placing the hook 13 at the lower end of body member 10 so that it extends beneath and grips the lower edge of the front bumper of the automobile. Body member 10 is held in substantially horizontal position while this is accomplished. Body member 10 is then raised toward the automobile until it is slightly short of being in a directly upright position. The flattened portion adjacent the lower end of body member 10 will yield and follow the contour of the bumper of the automobile to provide a tight fit.

The catch 19 on the end of rod 17 is then hooked around the highest available part of the front of the automobile. This is customarily a part of the grille. The nut 18 is loosened or tightened to provide a tight connection whereby rod 17 exerts a slight amount of tension on body member 10. Once the nut 18 has been adjusted to its proper position, it need not be changed. The catch 19 can be released and reattached by exerting pressure on the upper part of body member 10 to move it toward the automobile. There is sufficient resilience in body member 10 and the bumper of the automobile to permit the catch 19 to be attached to and detached from the grille in this manner.

In cases where it is not feasible to connect the catch 19 to the grille, it may be hooked onto the back of a bumper guard or to the back of the top part of the bumper itself. In any event, the higher it is placed the steadier support it will provide for the fishing poles.

It may be noted that since the flattened portion 11 curves around the bumper, it presses tightly against the bumper at a point above the farthest forward projection of the bumper. It thus provides a pipe wrench effect which makes for a firm grip to hold the device steady as to forward, backward and/or sideward movement.

A pair of fishing poles may be mounted in my device by placing the shafts of the poles so that they are disposed within the channels 21 of the carrier plate 20. The knob 23 is loosened to permit the poles to be placed in position and then tightened until the washer 26 contacts the shafts of the poles. As the knob 23 is tightened further, the washer 26 will remain stationary while the knob 23 and shank 24 are rotated.

It should be noted that the difference in the diameters of end portion 25 and washer 26, together with the length of end portion 25, provides a certain limited amount of play for washer 26, permitting canting movement of washer 26. This canting movement is limited so that it is sufficient to permit two poles of different diameters to be carried while at the same time being so restricted that one pole can be carried and held in one of the channels 21 with the other channel 21 empty.

The knob 23 can easily be loosened and tightened to permit the insertion and removal of the poles. The poles are preferably positioned so that they extend approximately a foot above the roof of the car. This leaves the poles sufficient room to flex, while permitting clearance for passing under trees and overpasses. When carried in this position, the poles not only have a minimum amount of air resistance, but the speed of the passing air actually dampens their vibrations to hold them steady.

With my device, a trout fisherman may move from one part of a stream to another, using the automobile and carrying his poles without removing the leaders and without placing the poles inside the automobile. Glass poles in particular are very often damaged in such moves.

Another embodiment of the automobile attaching portion of my invention is shown in Fig. 3 of the drawings. In this embodiment, the body member 30 is made of a flat piece of extruded iron which is stamped convex along its longitudinal center. The body member 30 is provided adjacent its lower end with a curved portion 31 and hook 32 and at its top portion with a flange 37 through which a screw-threaded bolt 33 extends. The body member 30 is provided with a plurality of spaced holes 38, through any one of which a rod 34 may extend, the rod carrying a hook 35 at one end and a screw-threaded adjusting bolt 36 adjacent its opposite end on the opposite side of body member 30.

Another embodiment of the fishing pole carrying portion of my invention is shown in Fig. 5 of the drawings. It comprises a carrier plate 40 which is provided with a flat bottom and a pair of upstanding flanges 41 which extend along its opposite sides. A bolt 42 has its screw-threaded shank 43 extending upwardly from the carrier plate 40. Screw-threadedly mounted on shank 43, is a holding member 44, which has the shape of an inverted triangle. The sides of holding member 44 extend at an angle upwardly and outwardly from shank 43 and are adapted to engage the shafts of a pair of fishing poles. The poles are held between the bottom and flanges 41 of the carrier plate 40 and the sides of the holding member 44.

I claim:

1. A fishing pole carrier for automobiles comprising an elongated body member formed of hollow tubing, said body member having a flattened portion adjacent the lower end thereof formed by pressing the sides of said tubing together, said flattened portion having a hook at the end thereof, said hook adapted to grip the bottom edge of the front bumper of an automobile, said flattened portion adapted to be bent to conform to the front contour of the bumper, a U-shaped member slidably mounted on said body member, said U-shaped member having a pair of arms projecting from said body member, a rod extending through openings in said arms, said rod having a nut screw threadedly mounted thereon adjacent one end thereof, said rod having a catch portion adjacent the opposite end thereof on the opposite side of said body member, said catch adapted to be attached to the grille of an automobile, a carrier plate attached to the top of said body member and extending at an angle with respect thereto, said carrier plate including a pair of elongated channels, a bolt upstanding from said plate between said channels, a knob screw threadedly mounted on said bolt, a washer disposed above said carrier plate and movable by manual rotation of said knob, each of said channels adapted to removably receive the handle of a fishing pole so that said poles extend rearwardly from above the front bumper of the automobile over the top of the automobile, said knob adapted to be manually tightened or loosened to move said washer toward or away from said channels to hold said fishing poles in said carrier plate.

2. The subject matter of claim 1, said washer being loosely mounted so that it is permitted to cant a limited amount to either side, the amount of said canting being sufficient to permit fishing poles of different diameters to be held in said channels and to permit a single fishing pole to be held in one of said channels while the other channel is empty.

3. A fishing pole carrier for automobiles comprising an elongated body member having a hook at the bottom end thereof, said hook adapted to grip the bottom edge of the front bumper of an automobile, a rod extending transversely to said body member, said rod being adjustably mounted with respect to said body member, said rod having a catch portion adjacent one end thereof, said catch portion adapted to be attached to a portion of the automobile above the bottom edge of the front bumper, a carrier plate attached to the top of said body member, said carrier plate including a pair of elongated channels, a bolt upstanding from said plate between said channels, a knob screw threadedly mounted on said bolt, a washer disposed above said carrier plate and movable by manual rotation of said knob, each of said channels adapted to removably receive the handle of a fishing pole so that said poles extend rearwardly from above the front bumper of the automobile over the top of the automobile, said knob adapted to be manually tightened or loosened to move said washer toward or away from said channels to hold said fishing poles in said carrier plate.

4. A fishing pole carrier for automobiles comprising an elongated body member having a hook at the bottom thereof, said hook adapted to grip the bottom edge of the front bumper of an automobile, said body member being adapted to conform to the front contour of the bumper, carrier means comprising a plurality of channels disposed adjacent the top of said body member for removably receiving and holding a plurality of fishing poles, a holding member mounted above said channels and adapted to be manually loosened and tightened to hold said poles in said channels and a rod extending transversely to said body member, said rod having a catch at one end thereof, said catch being adapted to grip the grille or other suitable portion of the automobile to provide a second point of attachment above the hook at the bottom of said body member, said rod being movable to different positions along said body member to permit attachment of said hook at different heights on different makes and models of automobiles.

5. A fishing pole carrier for automobiles comprising an elongated body member having a hook at the bottom thereof, said hook adapted to grip the bottom edge of the front bumper of an automobile, said body member being adapted to fit around the front bumper, carrier means comprising a plurality of channels disposed adjacent the top of said body member for removably receiving and holding a plurality of fishing poles, a holding member mounted above said channels and adapted to be manually loosened and tightened to hold said poles in said channels and a rod extending transversely to said body member, said rod having a catch at one end thereof, said catch being adapted to grip the grille or other suitable portion of the automobile to provide a second point of attachment above the hook at the bottom of said body member.

6. A fishing pole carrier for automobiles comprising an elongated body member having a hook at the bottom thereof, said hook adapted to grip the bottom edge of the front bumper of an automobile, said body member being adapted to fit around the front bumper, carrier means comprising a plurality of channels disposed adjacent the top of said body member for removably receiving and holding a plurality of fishing poles, and a holding member mounted above said channels, said holding member adapted to be manually loosened and tightened to hold said poles in said channels.

References Cited in the file of this patent

UNITED STATES PATENTS

| | | |
|---|---|---|
| 2,106,503 | Hendrick | Jan. 25, 1938 |
| 2,220,292 | Schmidt | Nov. 5, 1940 |
| 2,338,955 | Metcalf | Jan. 11, 1944 |
| 2,431,400 | Iverson | Nov. 25, 1947 |